(12) United States Patent
Nisikawa

(10) Patent No.: US 7,522,273 B2
(45) Date of Patent: Apr. 21, 2009

(54) APPARATUS AND METHOD FOR MEASURING AN OPTICAL CHARACTERISTIC WITHOUT ADVERSE EFFECTS OF A DEVIATION OF A POLARIZED COMPONENT

(75) Inventor: Kenzi Nisikawa, Saitama (JP)

(73) Assignee: ADVANTEST Corporation, Tokyo (JP)

( * ) Notice: Subject to any disclaimer, the term of this patent is extended or adjusted under 35 U.S.C. 154(b) by 404 days.

(21) Appl. No.: 10/553,909

(22) PCT Filed: Apr. 22, 2004

(86) PCT No.: PCT/JP2004/005758
§ 371 (c)(1),
(2), (4) Date: Oct. 21, 2005

(87) PCT Pub. No.: WO2004/094983
PCT Pub. Date: Nov. 4, 2004

(65) Prior Publication Data
US 2007/0064221 A1    Mar. 22, 2007

(30) Foreign Application Priority Data
Apr. 24, 2003    (JP) .............................. 2003-119861

(51) Int. Cl.
*G01N 21/00* (2006.01)
(52) U.S. Cl. .................................................. 356/73.1
(58) Field of Classification Search ................ 356/73.1, 356/364–369
See application file for complete search history.

(56) References Cited
U.S. PATENT DOCUMENTS
5,473,457 A * 12/1995 Ono .............................. 398/185

5,717,489 A    2/1998 Ozeki et al.
2002/0149823 A1    10/2002 Bergano et al.

FOREIGN PATENT DOCUMENTS
JP    9-264814    10/1997
JP    2002-368702    12/2002
JP    2003-106942    4/2003

OTHER PUBLICATIONS
English Language Abstract of JP 9-264814.
English Language Abstract of JP 2003-106942.
English Language Abstract of JP 2002-368702.

* cited by examiner

*Primary Examiner*—Michael P. Stafira
*Assistant Examiner*—Tara S Pajoohi
(74) *Attorney, Agent, or Firm*—Greenblum & Bernstein, P.L.C.

(57) ABSTRACT

The adverse effect of the deviation of a polarized component on measurement of an optical characteristic is prevented. A second measuring section determines group delay times of the incident light entering an optical fiber from the exit light emerging from the optical fiber. If there is any deviation along the p- or s-polarization axis of the amplitude equivalent value (power) measured by a first measuring section, an optical characteristic measuring section determines group delay times from the components of the transfer function of the optical fiber. Therefore, even if there is any deviation along the p- or s-polarization axis of the amplitude equivalent value (power) measured by the first measuring section, the group delay times are determined on the basis of the results of measurement (not influenced by the deviation along the p- or s-polarization axis of the power) by the second measuring section.

6 Claims, 4 Drawing Sheets

APPARATUS AND METHOD FOR MEASURING AN OPTICAL CHARACTERISTIC WITHOUT ADVERSE EFFECTS OF A DEVIATION OF A POLARIZED COMPONENT

TECHNICAL FIELD

The present invention relates to measurement of optical characteristics of a device under test (DUT: Device Under Test) such as optical fibers used for optical communication.

BACKGROUND ART

Measurement of optical characteristics of optical fibers has been carried out conventionally. For example, Patent Document 1 (Japanese Laid-Open Patent Publication (Kokai) No. H9-264814) describes a polarization mode dispersion measuring device for optical fibers. With reference to FIG. 4, a description will now be given of the device for measuring the polarization mode dispersion of optical fibers according to Patent Document 1.

First, the polarization mode dispersion $\tau_{PMD}$ of an optical fiber under test 104 is defined by the following equation (1):

[EQU. 1]

$$\tau_{PMD} = 2\sqrt{\theta^2 + \psi_1^2 \cos^2\theta + \psi_2^2 \sin^2\theta} \quad (1)$$

It should be noted that, in the above equation, $\theta$ denotes a polarization angle, $\psi_1$ denotes a phase shift in a certain direction on a plane perpendicular to the propagation direction of light, and $\psi_2$ denotes a phase shift in a direction orthogonal to $\psi_1$. On this occasion, a transfer function matrix [T] of the optical fiber under test 104 is defined by the following equation (2):

[EQU. 2]

$$[T(\omega)] = \begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \quad (2)$$

It should be noted that, in the above equation, $|T_{ij}|$ denotes an amplitude of respective matrix elements, $\phi_{ij}$ denotes a phase shift of the respective matrix elements, and both of them are functions of an optical angular frequency $\omega$. Thus, the parameters $\theta$, $\psi_1$, and $\psi_2$ in the equation (1) are respectively obtained by the following equations (3), (4), and (5).

$$\theta(\omega) = 0.5 \cos^{-1}(|T_{11}|^2 - |T_{21}|^2) \quad (3)$$

$$\psi_1(\omega) = (\phi_{11} - \phi_{22})/2 \quad (4)$$

$$\psi_2(\omega) = (\phi_{21} - \phi_{12} + \pi)/2 \quad (5)$$

Consequently, the polarization mode dispersions $\tau_{PMD}$ of the optical fiber under test 104 is obtained by obtaining the transfer function matrix [T] of the optical fiber under test 104.

A description will now be given of how to obtain the transfer function matrix [T] of the optical fiber under test 104 with reference to FIG. 4. First, a control section 109 makes output light of a polarization controller 103 as a linearly polarized wave coincident with a p-direction of a polarization beam splitter 105 incident to the optical fiber under test 104. On this occasion, output light from the optical fiber under test 104 is represented by the following equation (6):

[EQU. 3]

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 1 \\ 0 \end{bmatrix} = \begin{bmatrix} |T_{11}|e^{-j\phi_{11}} (p\ \text{component}) \\ |T_{21}|e^{-j\phi_{21}} (s\ \text{component}) \end{bmatrix} \quad (6)$$

The above-described output light is split into an s-polarization component and a p-polarization component by the polarization beam splitter 105, and then, the components are made incident to O/E converters $106_1$ and $106_2$ respectively, and the O/E converters $106_1$ and $106_2$ respectively measure:

[EQU. 4]

$$|T_{11}|e^{-j\phi_{11}}, |T_{21}|e^{-j\phi_{21}}$$

After the above-described measurement, the control section 109 rotates output light of the polarization controller 103 at 90°, and makes the resulting light as a linearly polarized wave coincident with an s direction of the polarization beam splitter 105 incident to the optical fiber under test 104. On this occasion, output light from the optical fiber under test 104 is represented by the following equation (7):

[EQU. 5]

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 0 \\ 1 \end{bmatrix} = \begin{bmatrix} |T_{12}|e^{-j\phi_{12}} (p\ \text{component}) \\ |T_{22}|e^{-j\phi_{22}} (s\ \text{component}) \end{bmatrix} \quad (7)$$

The above-described output light is split into an s-polarization component and a p-polarization component by the polarization beam splitter 105, the components are made incident to the O/E converters $106_1$ and $106_2$ respectively, and the O/E converters $106_1$ and $106_2$ respectively measure:

[EQU. 6]

$$|T_{12}|e^{-j\phi_{12}}, |T_{22}|e^{-j\phi_{22}}$$

A network analyzer 107 obtains the parameters $\theta$, $\psi_1$, and $\psi_2$ from the respective parameters measured as described above, and the equations (3), (4), and (5). It should be noted that the network analyzer 107 controls an intensity modulation ratio in an optical intensity modulator 102 via an amplifier 108.

Then, the above-described measurement is carried out while the output wavelength of a wavelength-variable light source 101 is being swept, thereby obtaining $\theta(\omega)$, $\psi_1(\omega)$, and $\psi_2(\omega)$ from the respective measurement results. Then, the control section 109 obtains the polarization mode dispersion $\tau_{PMD}$ from the equation (1).

However, according to the method described above, when the output light of the optical fiber under test 104 is split into the s-polarization component and p-polarization component by the polarization beam splitter 105, the power may be deviated. Namely, either the s-polarization component or the p-polarization component output from the polarization beam splitter 105 may be extremely larger than the other component. In an extreme case, only the p-polarization component is output, and the s-polarization component is not output.

In this case, the S/N ratio of the phase of a component with a smaller power degrades, and the measurement of the phase hence becomes inaccurate. Consequently, measured results of a group delay time and the polarization mode dispersion of the optical fiber under test 104 contain a noise, and the measurement thereof hence becomes inaccurate.

A purpose of the present invention is to provide an optical characteristic measuring instrument and the like which prevent adverse influence upon the measurement of the optical characteristics due to a deviation between the polarization components.

DISCLOSURE OF THE INVENTION

According to the present invention, an optical characteristic measuring instrument that measures an optical characteristic of a device under test, includes: a polarization separating unit that receives light having emitted from the device under test, separates the received light into p-polarized light and s-polarized light, and outputs the p-polarized light and s-polarized light; a light generating unit that generates incident light; an optical modulation unit that applies intensity modulation to the incident light, and emits modulated light; a light input unit that makes the incident light which has undergone the intensity modulation incident on the device under test wherein the incident light is coincident with a p-polarization axis and an s-polarization axis of the polarization separating unit; a first measuring unit that measures a phase shift equivalent value and an amplitude equivalent value of the incident light based upon the output from the polarization separating unit; a second measuring unit that measures a phase shift equivalent value of the incident light based upon the light emitted from the device under test; and an optical characteristic measuring unit that measures the optical characteristic of the device under test based upon the measured results by the first measuring unit and the second measuring unit.

According to the optical characteristic measuring instrument configured as described above, the second measuring unit measures the phase shift equivalent value of the incident light based upon the light emitted from the device under test. The optical characteristic measuring unit measures the optical characteristic of the device under test based upon the measured result by the second measuring unit. Thus, even if there is a deviation on the p-polarization axis or the s-polarization axis in the amplitude equivalent value measured by the first measuring unit, since the optical characteristic of the device under test is measured based upon the measured result by the second measuring unit, and it is thus possible to prevent adverse influence upon the measurement of the optical characteristic due to the deviation of the polarization component.

The optical characteristic measuring unit measures the optical characteristic of the device under test based upon the measured result by the second measuring unit if a p-polarization component of the amplitude equivalent value of the incident light measured by the first measuring unit being excessively large or excessively small compared with that of an s-polarization component thereof.

The phase shift equivalent value is obtained by differentiating a phase shift by an optical angular frequency.

The amplitude equivalent value is the square of an amplitude.

A group delay time measuring unit measures a group delay time of the device under test based upon the measured result by the second measuring unit.

According to the present invention, an optical characteristic measuring method for measuring an optical characteristic of a device under test, includes: a polarization separating step of receiving light having emitted from the device under test, separating the received light into p-polarized light and s-polarized light, and outputting the p-polarized light and s-polarized light; a light generating step of generating incident light; an optical modulation step of applying intensity modulation to the incident light, and emitting modulated light; a light input step of making the incident light which has undergone the intensity modulation incident on the device under test wherein the incident light is coincident with a p-polarization axis and an s-polarization axis of the polarization separating step; a first measuring step of measuring a phase shift equivalent value and an amplitude equivalent value of the incident light based upon the output of the polarization separating step; a second measuring step of measuring a phase shift equivalent value of the incident light based upon the light emitted from the device under test; and an optical characteristic measuring step of measuring the optical characteristic of the device under test based upon the measured results by the first measuring step and the second measuring step.

According to the present invention, there is a program of instructions for execution by the computer to perform an optical characteristic measuring process of an optical characteristic measuring instrument that measures an optical characteristic of a device under test, having: a polarization separating unit that receives light having emitted from the device under test, separates the received light into p-polarized light and s-polarized light, and outputs the p-polarized light and s-polarized light; a light generating unit that generates incident light; an optical modulation unit that applies intensity modulation to the incident light, and emits modulated light; and a light input unit that makes the incident light which has undergone the intensity modulation incident on the device under test wherein the incident light is coincident with a p-polarization axis and an s-polarization axis of the polarization separating unit; the optical characteristic measuring process including: a first measuring step of measuring a phase shift equivalent value and an amplitude equivalent value of the incident light based upon the output of the polarization separating step; a second measuring step of measuring a phase shift equivalent value of the incident light based upon the light emitted from the device under test; and an optical characteristic measuring step of measuring the optical characteristic of the device under test based upon the measured results by the first measuring step and the second measuring step.

According to the present invention, there is a computer-readable medium having a program of instructions for execution by the computer to perform an optical characteristic measuring process of an optical characteristic measuring instrument that measures an optical characteristic of a device under test, having: a polarization separating unit that receives light having emitted from the device under test, separates the received light into p-polarized light and s-polarized light, and outputs the p-polarized light and s-polarized light; a light generating unit that generates incident light; an optical modulation unit that applies intensity modulation to the incident light, and emits modulated light; and a light input unit that makes the incident light which has undergone the intensity modulation incident on the device under test wherein the incident light is coincident with a p-polarization axis and an s-polarization axis of the polarization separating unit; the optical characteristic measuring process including: a first measuring step of measuring a phase shift equivalent value and an amplitude equivalent value of the incident light based upon the output of the polarization separating step; a second measuring step of measuring a phase shift equivalent value of the incident light based upon the light emitted from the device under test; and an optical characteristic measuring step of measuring the optical characteristic of the device under test based upon the measured results by the first measuring step and the second measuring step.

BEST MODE FOR CARRYING OUT THE INVENTION

A description will now be given of an embodiment of the present invention with reference to drawings.

Figure 1:
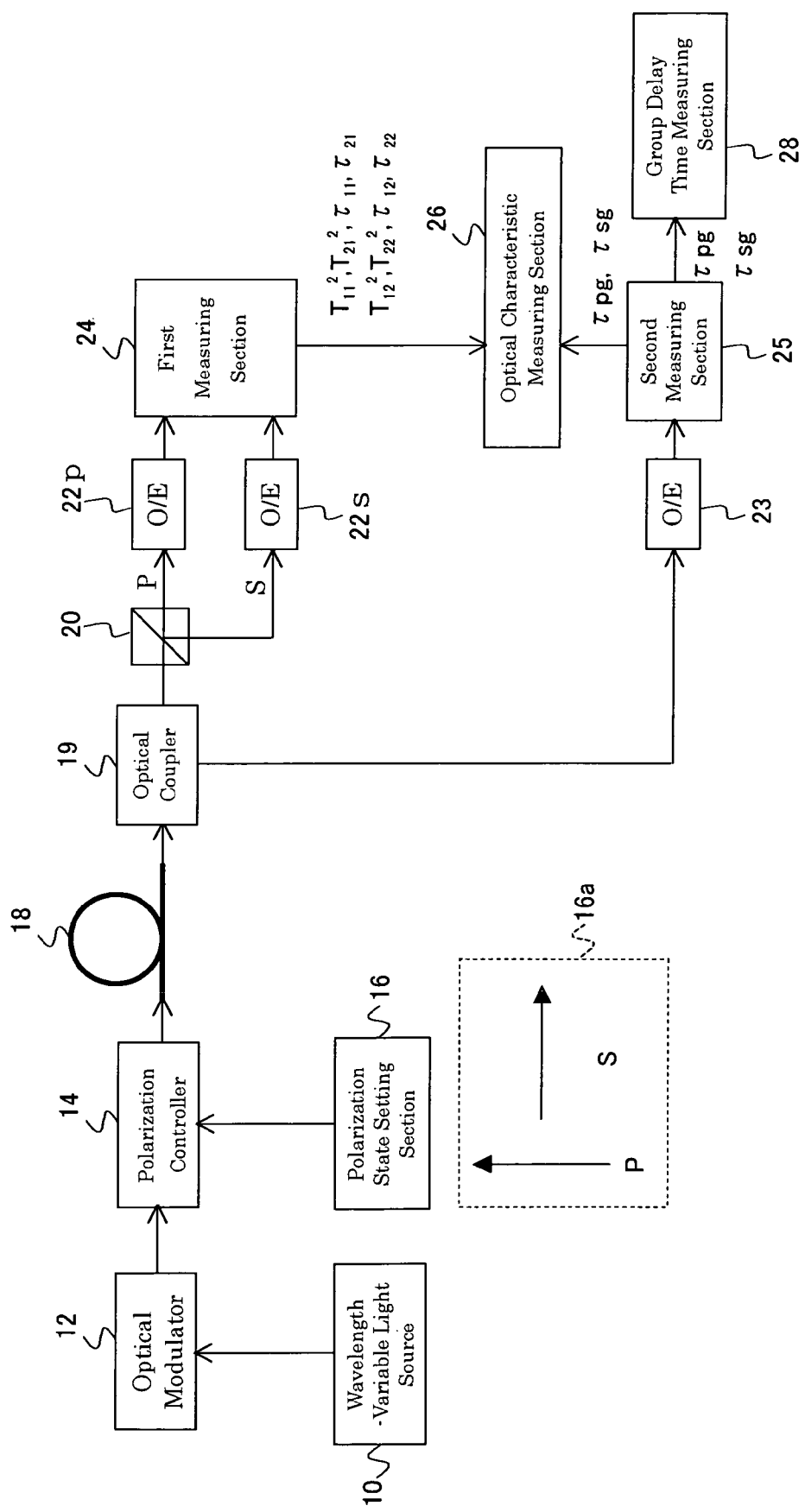
FIG. 1 is a block diagram showing a configuration of an optical characteristic measuring instrument according an embodiment of the present invention.

FIG. 1 is a block diagram showing a configuration of an optical characteristic measuring instrument according an embodiment of the present invention. The optical characteristic measuring instrument according to the embodiment of the present invention is used to obtain optical characteristics of an optical fiber 18, which is a device under test (DUT). The optical characteristic measuring instrument according to the embodiment of the present invention includes a wavelength-variable light source (light generating means) 10, an optical modulator 12, a polarization controller (light input means) 14, a polarization state setting section 16, an optical coupler 19, a polarization separator 20, optical/electrical (O/E) converters 22$p$ and 22$s$, an optical/electrical (O/E) converter 23, a first measuring section 24, a second measuring section 25, an optical characteristic measuring section 26, and a group delay time measuring section 28.

The wavelength-variable light source 10 generates incident light while changing the wavelength thereof. It should be noted that an optical angular frequency $\omega=2\pi f=2\pi c/\lambda$. In the above equation, c denotes the velocity of light, and $\lambda$ denotes wavelength thereof. Changing the wavelength $\lambda$ thus corresponds to changing the optical angular frequency $\omega$.

The optical modulator 12 applies intensity modulation to the incident light, and emits modulated incident light to the polarization controller 14.

The polarization controller (light input means) 14 controls a polarization state of the incident light according to control by the polarization state setting section 16.

The polarization state setting section 16 sets the polarization state of the incident light. Namely, the polarization state setting section 16 makes the incident light coincident with a p-polarization axis and an s-polarization axis (16$a$) in the polarization separator 20. Namely, the polarization state setting section 16 causes the incident light to be a linearly polarized wave which is coincident with the p-polarization axis and s-polarization axis.

When the incident light is made incident on the optical fiber 18, which is the device under test, the incident light passes the optical fiber 18.

The optical coupler 19 receives the light which has passed the optical fiber 18, namely the light emitted from the optical fiber 18. The optical coupler 19 then separates the light emitted from the optical fiber 18, and outputs results of the separation to the polarization separator 20 and the optical/electrical (O/E) converter 23.

The polarization separator 20 receives the light which has passed the optical fiber 18, namely the light emitted from the optical fiber 18, separates the light into p-polarized light and s-polarized light, and outputs results of the separation.

The optical/electrical (O/E) converter 22$p$ applies optical/electrical conversion to the p-polarization component in the outputs of the polarization separator 20, and outputs a result of the conversion to the first measuring section 24. The optical/electrical (O/E) converter 22$s$ applies optical/electrical conversion to the s-polarization component in the outputs of the polarization separator 20, and outputs a result of the conversion to the first measuring section 24.

The optical/electrical (O/E) converter 23 receives the light emitted from the optical fiber 18 via the optical coupler 19, applies optical/electrical conversion to the received light, and outputs a result of the conversion to the second measuring section 25.

The first measuring section 24 measures phase shift equivalent values and amplitude equivalent values of the incident light based upon the outputs from the polarization separator 20. The phase shift equivalent value is a value corresponding to a phase shift. Although the phase shift equivalent value may be the phase shift itself, a value obtained by differentiating the phase shift by the optical angular frequency (group delay time) is the phase shift equivalent value, for example. The amplitude equivalent value is a value corresponding to the amplitude. Although the amplitude equivalent value may be an amplitude itself, a value obtained by squaring the amplitude (power) is the amplitude equivalent value, for example.

The second measuring section 25 measures phase shift equivalent values and amplitude equivalent values of the incident light based upon the output from the optical/electrical (O/E) converter 23. Namely, the second measuring section 25 measures the phase shift equivalent values and amplitude equivalent values of the incident light based upon the light emitted from the optical fiber 18. It should be noted that the amplitude equivalent values may not be measured.

The optical characteristic measuring section 26 obtains the optical characteristics of the optical fiber 18 based upon the measured results by the first measuring section 24 and the second measuring section 25. In the present embodiment, the optical characteristic measuring section 26 obtains group delay times $\tau_{11}(=d\theta_{11}/d\omega)$, $\tau_{21}(=d\theta_{21}/d\omega)$, $\tau_{12}(=d\theta_{12}/d\omega)$, and $\tau_{22}(=d\theta_{22}/d\omega)$, which are derivatives obtained by differentiating parameters $\theta_{11}$, $\theta_{21}$, $\theta_{12}$, and $\theta_{22}$ of elements of a transfer function matrix of the optical fiber 18 by the optical angular frequency $\omega$. It should be noted that the optical characteristic is not limited to these values, and may be a wavelength dispersion, a wavelength dispersion slope, a polarization mode dispersion, and the like. The wavelength dispersion and the like can be obtained based upon $\tau_{11}$, $\tau_{21}$, $\tau_{12}$, and $\tau_{22}$.

The group delay time measuring section 28 obtains a group delay time $\tau_g$ of the optical fiber 18 based upon the measured results by the second measuring section 25.

Figure 2:
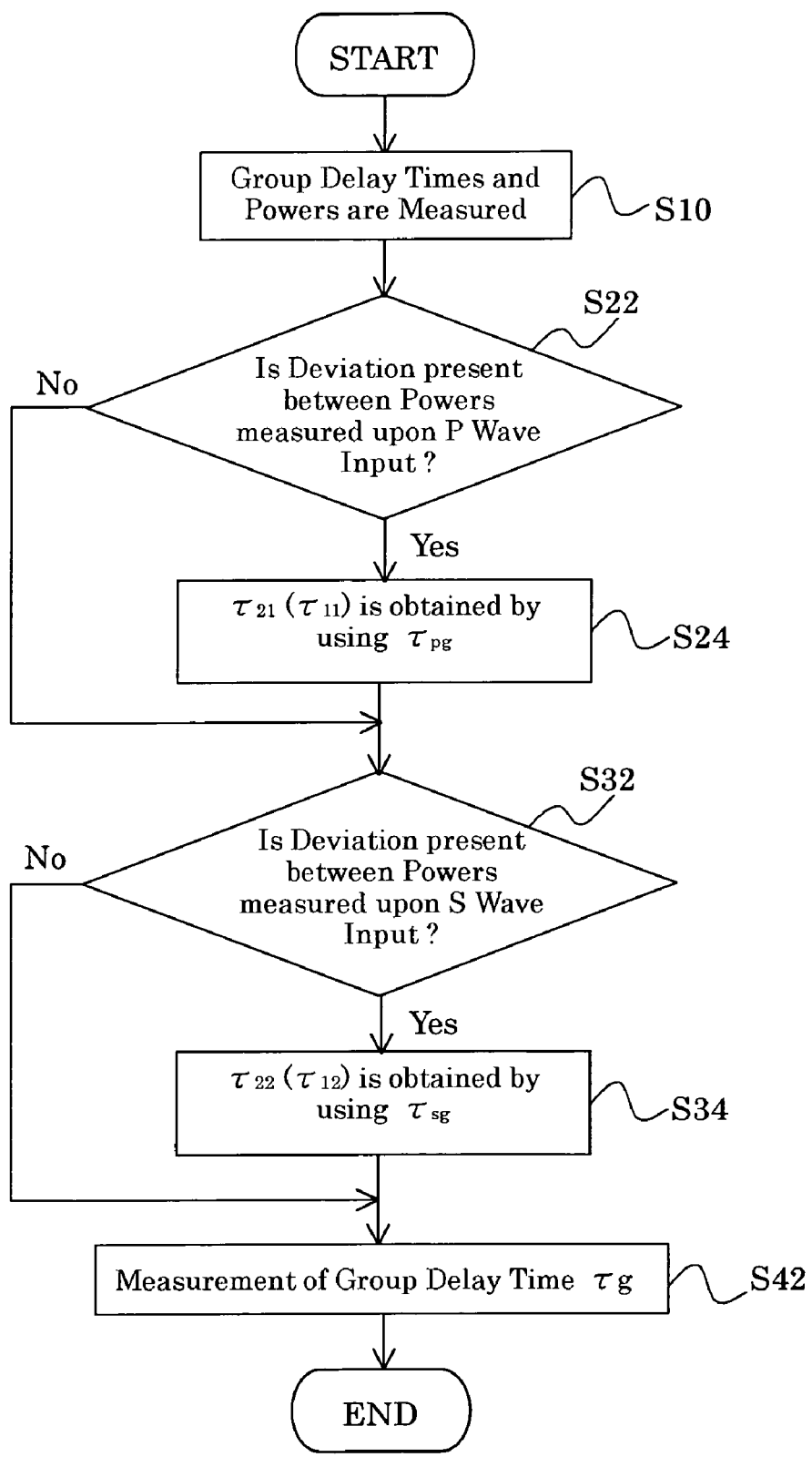
FIG. 2 is a flowchart showing an operation of the optical characteristic measuring instrument according to the embodiment of the present invention.

A description will now be given of an operation of the optical characteristic measuring instrument according to the embodiment of the present invention with reference to a flowchart in FIG. 2.

Figure 3:
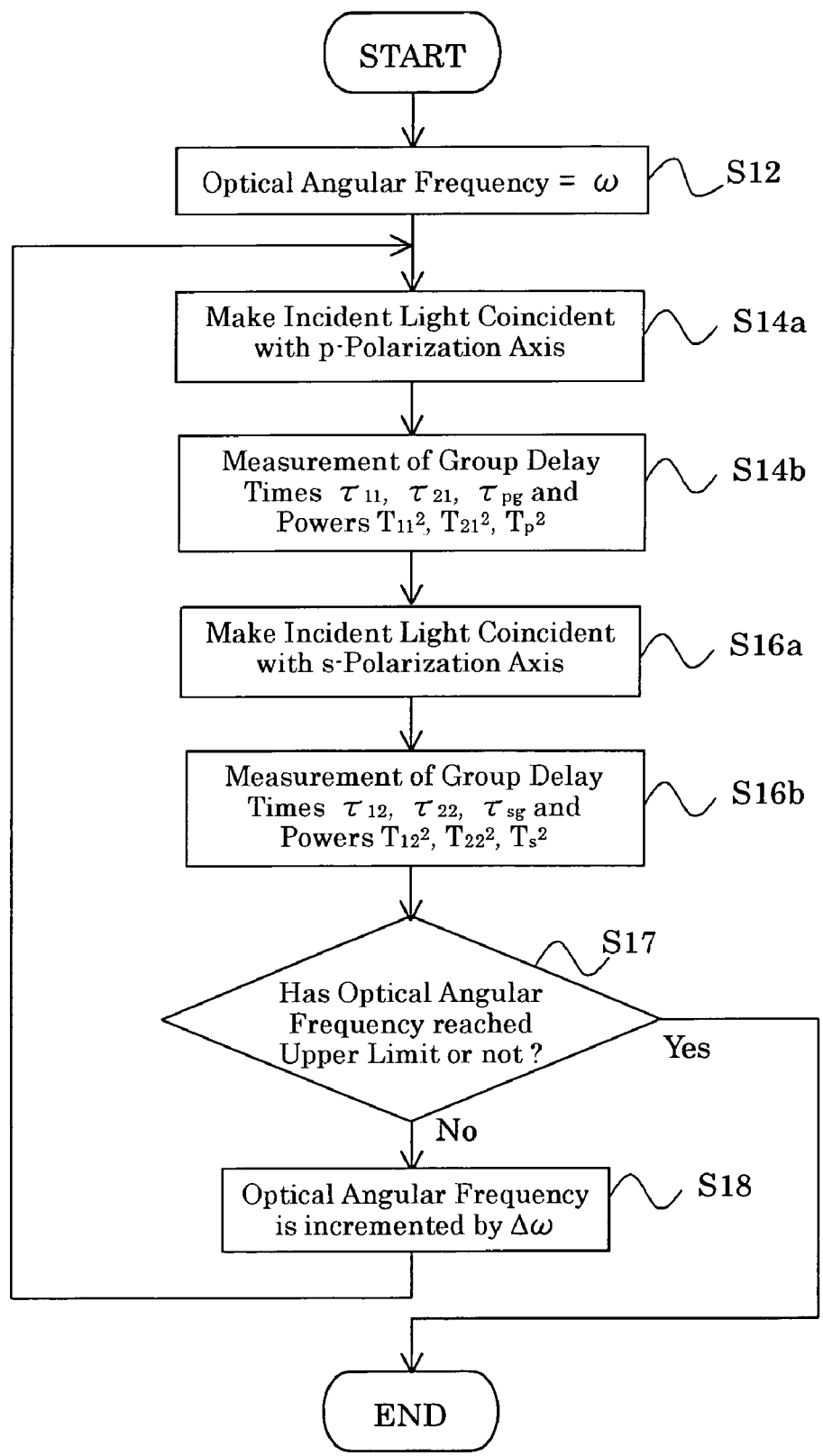
FIG. 3 is a flowchart showing a procedure for measuring phase shift equivalent values and amplitude equivalent values of incident light.
Figure 4:
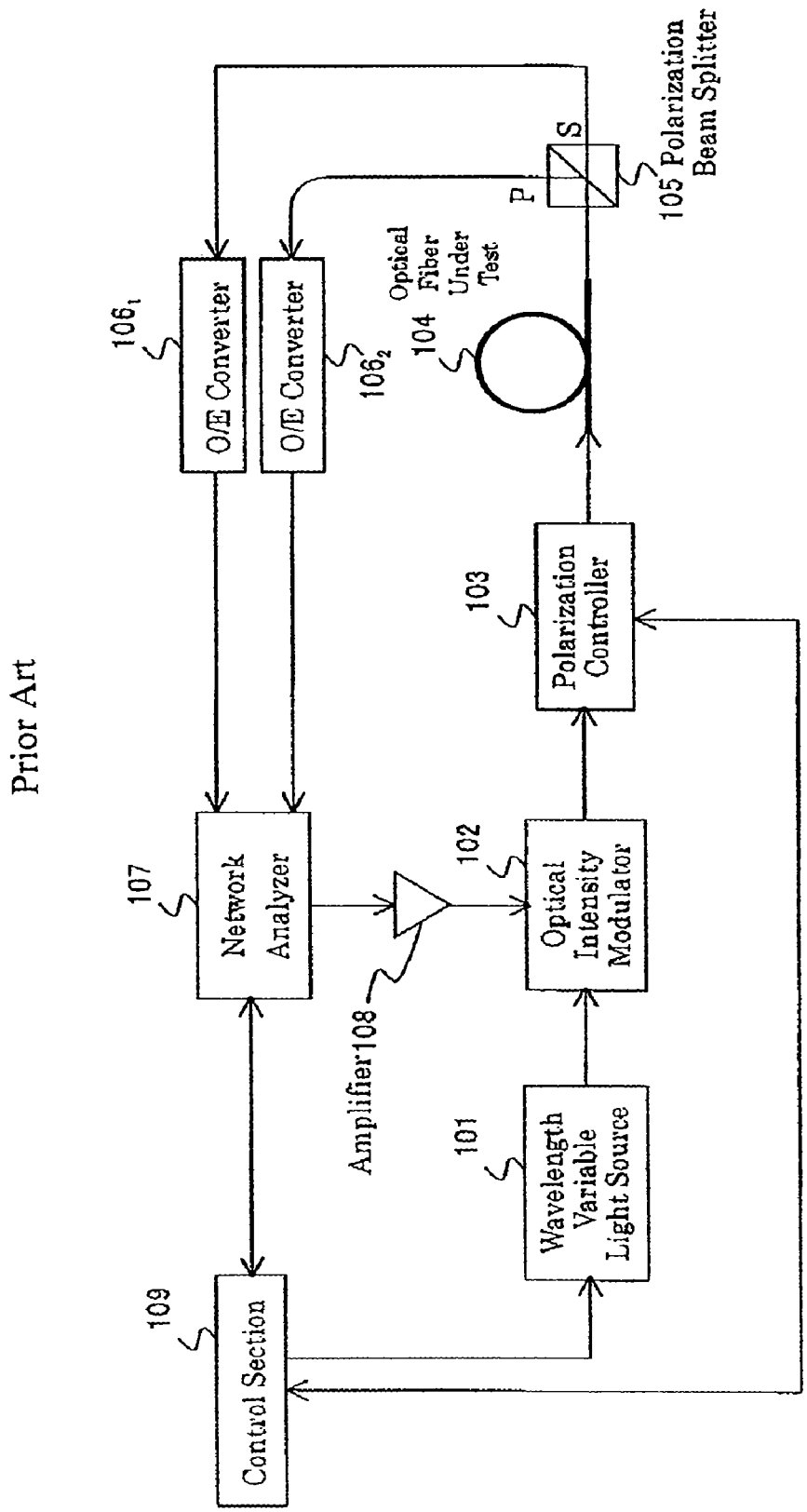
FIG. 4 is a block diagram showing a configuration of a device for measuring the polarization mode dispersion of optical fibers according to a prior art (Japanese Laid-Open Patent Publication (Kokai) No. H9-264814).

First, the phase shift equivalent values and the amplitude equivalent values are measured while the incident light is coincident with the p-polarization axis and s-polarization axis (16$a$) in the polarization separator 20 (S10). A description will now be given of a procedure of this measurement with reference to a flowchart in FIG. 3.

First, the optical angular frequency of the light output from the wavelength-variable light source 10 is set to ω (S12). With reference to FIG. 1, the wavelength-variable light source 10 emits the incident light having the optical angular frequency ω. The incident light undergoes the intensity modulation applied by the optical modulator 12, and is emitted to the polarization controller 14. On this occasion, the polarization state setting section 16 makes the incident light coincident with the p-polarization axis in the polarization separator 20 (S14a). Namely, the polarization state setting section 16 causes the incident light to be a linearly polarized wave which is coincident with the p-polarization axis. Then, the incident light is made incident on the optical fiber 18.

The incident light having passed the optical fiber 18 is supplied to the polarization separator 20 and the optical/electrical (O/E) converter 23 via the optical coupler 19. The light supplied to the polarization separator 20 is separated into the p-polarized light and the s-polarized light by the polarization separator 20. The p-polarization component output from the polarization separator 20 undergoes the optical/electrical conversion by the optical/electrical (O/E) converter 22p, and is output to the first measuring section 24. The s-polarization component output from the polarization separator 20 undergoes the optical/electrical conversion by the optical/electrical (O/E) converter 22s, and is output to the first measuring section 24. The first measuring section 24 then measures the phase shift equivalent values (group delay times) $\tau_{11}$ and $\tau_{21}$, and amplitude equivalent values (powers) $T_{11}^2$ and $T_{21}^2$ (S14b).

The light supplied to the optical/electrical (O/E) converter 23 undergoes the optical/electrical conversion by the optical/electrical (O/E) converter 23, and is output to the second measuring section 25. The second measuring section 25 then measures a phase shift equivalent value (group delay time) τpg and an amplitude equivalent value (power) $Tp^2$ (S14b).

A description will now be given of how the first measuring section 24 obtains the phase shift equivalent values and the amplitude equivalent values (S14b).

First, the transfer function matrix [T] of the optical fiber 18 is defined by the following equation (10):

[EQU. 7]

$$[T] = \begin{bmatrix} T_{11}e^{-j\theta_{11}} & T_{12}e^{-j\theta_{12}} \\ T_{21}e^{-j\theta_{21}} & T_{22}e^{-j\theta_{22}} \end{bmatrix} \quad (10)$$

It should be noted that respective elements of the transfer function matrix [T] are represented by the following equations (11):

[EQU. 8]

$$T_{11}e^{-j\theta_{11}} = U\cos\Theta e^{-j(\Phi_1+\phi+\psi)}$$

$$T_{12}e^{-j\theta_{12}} = -U\sin\Theta e^{-j(\Phi_1+\phi-\psi)}$$

$$T_{21}e^{-j\theta_{21}} = U\sin\Theta e^{-j(\Phi_1-\phi+\psi)} \quad (11)$$

$$T_{22}e^{-j\theta_{22}} = U\cos\Theta e^{-j(\Phi_1-\phi-\psi)}$$

In the above equations, φ(ω) denotes a difference component of two orthogonal phase shift components $\psi_1(\omega)$ and $\psi_2(\omega)$, and ψ(ω) is an in-phase component of the two orthogonal phase shift components $\psi_1(\omega)$ and $\psi_2(\omega)$. It should be noted that $\psi_1(\omega)$ is a phase shift in a certain direction on a plane orthogonal to the traveling direction of light, and $\psi_2(\omega)$ is a phase shift in a direction orthogonal to $\psi_1$. Specifically, φ(ω)=($\psi_1(\omega)-\psi_2(\omega)$)/2, and ψ(ω)=($\psi_1(\omega)+\psi_2(\omega)$)/2. In addition Θ(ω) is the polarization angle of the light emitted from the optical fiber 18.

On this occasion, the incident light is made coincident with the p-polarization axis in the polarization separator 20. Consequently, the output from the polarization separator 20 is represented by the following equation (12).

[EQU. 9]

$$\begin{bmatrix} T_{11}e^{-j\theta_{11}} & T_{12}e^{-j\theta_{12}} \\ T_{21}e^{-j\theta_{21}} & T_{22}e^{-j\theta_{22}} \end{bmatrix} \begin{bmatrix} 1 \\ 0 \end{bmatrix} = \begin{bmatrix} T_{11}e^{-j\theta_{11}} \\ T_{21}e^{-j\theta_{21}} \end{bmatrix} \begin{matrix} p \text{ component} \\ s \text{ component} \end{matrix} \quad (12)$$

Light represented as $T_{11}e^{-j\theta_{11}}$ is input to the first measuring section 24 via the optical/electrical (O/E) converter 22p. At the same time, light represented as $T_{21}e^{-j\theta_{21}}$ is input to the first measuring section 24 via the optical/electrical (O/E) converter 22s. Consequently, the first measuring section 24 can measure values equivalent to respective phase shifts $\theta_{11}$ and $\theta_{21}$ of $T_{11}e^{-j\theta_{11}}$ and $T_{21}e^{-j\theta_{21}}$ such as the group delay times $\tau_{11}$ (=d$\theta_{11}$/dω) and $\tau_{21}$ (=d$\theta_{21}$/dω), which are values obtained by respectively differentiating the phase shifts $\theta_{11}$ and $\theta_{21}$ by the optical angular frequency ω, and values equivalent to amplitudes $T_{11}$ and $T_{21}$ such as $|T_{11}|^2$ and $|T_{21}|^2$, which are values (powers) obtained by respectively squaring the amplitudes. Namely, the first measuring section 24 can measure the phase shift equivalent values and the amplitude equivalent values on the first column of the transfer function matrix of the optical fiber 18.

Then, the polarization state setting section 16 makes the incident light coincident with the s-polarization axis (S16a) in the polarization separator 20. Namely, the polarization state setting section 16 causes the incident light to be a linearly polarized wave which is coincident with the s-polarization axis. Then, the incident light is made incident to the optical fiber 18.

The incident light having passed the optical fiber 18 is separated into the p-polarized light and s-polarized light by the polarization separator 20. The p-polarization component output from the polarization separator 20 undergoes the optical/electrical conversion by the optical/electrical (O/E) converter 22p, and is output to the first measuring section 24. The s-polarization component output from the polarization separator 20 undergoes the optical/electrical conversion by the optical/electrical (O/E) converter 22s, and is output to the first measuring section 24. The first measuring section 24 then measures the phase shift equivalent values (group delay times) $\tau_{12}$ and $\tau_{22}$, and amplitude equivalent values (powers) $T_{12}^2$ and $T_{22}^2$ (S16b).

The light supplied to the optical/electrical (O/E) converter 23 undergoes the optical/electrical conversion by the optical/electrical (O/E) converter 23, and is output to the second measuring section 25. The second measuring section 25 then measures a phase shift equivalent value (group delay time) τsg and an amplitude equivalent value (power) $Ts^2$ (S16b).

A description will now be given of how the first measuring section 24 obtains the phase shift equivalent values and the amplitude equivalent values (S16b). The incident light is made coincident with the s-polarization axis in the polarization separator 20. Consequently, the output from the polarization separator 20 is represented by the following equation (13).

[EQU. 10]

$$\begin{bmatrix} T_{11}e^{-j\theta_{11}} & T_{12}e^{-j\theta_{12}} \\ T_{21}e^{-j\theta_{21}} & T_{22}e^{-j\theta_{22}} \end{bmatrix} \begin{bmatrix} 0 \\ 1 \end{bmatrix} = \begin{bmatrix} T_{12}e^{-j\theta_{12}} \\ T_{22}e^{-j\theta_{22}} \end{bmatrix} \begin{matrix} p \text{ component} \\ s \text{ component} \end{matrix} \quad (13)$$

Light represented as $T_{12}e^{-j\theta_{12}}$ is input to the first measuring section 24 via the optical/electrical (O/E) converter 22p. At the same time, light represented as $T_{22}e^{-j\theta_{22}}$ is input to the first measuring section 24 via the optical/electrical (O/E) converter 22s. Consequently, the first measuring section 24 can measure values equivalent to respective phase shifts $\theta_{12}$ and $\theta_{22}$ of $T_{12}e^{-j\theta_{12}}$ and $T_{22}e^{-j\theta_{22}}$ such as the group delay times $\tau_{12}$ ($=d\theta_{12}/d\omega$) and $\tau_{22}$ ($=d\theta_{22}/d\omega$), which are values obtained by respectively differentiating the phase shifts $\theta_{12}$ and $\theta_{22}$ by the optical angular frequency $\omega$, and values equivalent to amplitudes $T_{12}$ and $T_{22}$ such as $|T_{12}|^2$ and $|T_{22}|^2$, which are values (powers) obtained by respectively squaring the amplitudes. Namely, the first measuring section 24 can measure the phase shift equivalent values and the amplitude equivalent values on the second column of the transfer function matrix of the optical fiber 18.

Then, it is determined whether the optical angular frequency has reached an upper limit or not (S17), and if the optical angular frequency has not reached the upper limit ("NO" in S17), the optical angular frequency is incremented by $\Delta\omega$ (S18), and the procedure returns to the step of making the incident light coincident with the p-polarization axis in the polarization separator 20 (S14a). If the optical angular frequency has reached the upper limit ("YES" in S17), the measurement of the phase shift equivalent values and the amplitude equivalent values when the incident light is coincident with the p-polarization axis and the s-polarization axis (16a) in the polarization separator 20 ends (refer to S10 in FIG. 2).

With reference to FIG. 2 again, the optical characteristic measuring section 26 receives the powers $T_{11}^2$ and $T_{21}^2$ measured upon the incident light being a linearly polarized wave coincident with the p-polarization axis (upon P wave input), and determines whether a deviation is present between them (S22). Namely, if $T_{11}^2 \gg T_{21}^2$ ($T_{11}^2$ is excessively larger than $T_{21}^2$), or $T_{11}^2 \ll T_{21}^2$ ($T_{11}^2$ is excessively smaller than $T_{21}^2$), the optical characteristic measuring section 26 determines that there is a deviation, and determines that there is no deviation otherwise. For example, there is set an upper threshold in advance, and the optical characteristic measuring section 26 determines that there is an excess if $T_{11}^2/T_{21}^2$ exceeds the upper threshold. Moreover, for example, a lower threshold is set in advance, and the optical characteristic measuring section 26 determines that there is an excess if $T_{11}^2/T_{21}^2$ is less than the lower threshold.

If there is a deviation between the powers $T_{11}^2$ and $T_{21}^2$ measured upon the P wave input ("YES" in S22), the optical characteristic measuring section 26 uses τpg to obtain $\tau_{21}$ or $\tau_{11}$ (S24).

On this occasion, there are following relationships among $T_{11}^2$, $T_{21}^2$, $\tau_{11}$, and $\tau_{21}$, which are the measured results by the first measuring section 24, and $Tp^2$ and τpg, which are the measured results by the second measuring section 25. It should be noted that a proof thereof will be provided later. In addition, $\theta'=\tau$.

[EQU. 11]

$$T_0^2 = T_{11}^2 + T_{21}^2 \quad (14)$$

$$\tau_{pg} = \frac{T_{11}^2 \theta'_{11} + T_{21}^2 \theta'_{21}}{T_{11}^2 + T_{21}^2} \quad (15)$$

If $T_{11}^2 \gg T_{21}^2$, the S/N ratio of $\tau_{21}$, which is the measured result of the first measuring section 24, is low. Thus, $\tau_{21}$ is calculated from $T_{11}^2$, $T_{21}^2$, $\tau_{11}$, and τpg according to the equation (15). If $T_{11}^2 \gg T_{21}^2$, the S/N ratios of $\tau_{11}$, which is the measured result of the first measuring section 24, and τpg, which is the measured result of the second measuring section 25, are high. As a result, if the $\tau_{21}$ is calculated according to the equation (15), the S/N ratio of $\tau_{21}$ becomes high.

If $T_{11}^2 \ll T_{21}^2$, the S/N ratio of $\tau_{11}$ is low, which is the measured result of the first measuring section 24. Thus, $\tau_{11}$ is calculated from $T_{11}^2$, $T_{21}^2$, $\tau_{21}$, and τpg according to the equation (15). If $T_{11}^2 \ll T_{21}^2$, the S/N ratios of $\tau_{21}$, which is the measured result of the first measuring section 24, and τpg, which is the measured result of the second measuring section 25, are high. As a result, if the $\tau_{11}$ is calculated according to the equation (15), the S/N ratio of $\tau_{11}$ becomes high.

After the calculation of $\tau_{21}$ or $\tau_{11}$ using τpg (S24), or there is no deviation between the powers $T_{11}^2$ and $T_{21}^2$ upon the P wave input ("NO" in the S22), the optical characteristic measuring section 26 receives the powers $T_{12}^2$ and $T_{22}^2$ measured upon the incident light being a linearly polarized wave coincident with the s-polarization axis (upon S wave input), and determines whether a deviation is present between them (S32). Namely, If $T_{12}^2 \gg T_{22}^2$ ($T_{12}^2$ is excessively larger than $T_{22}^2$), or $T_{12}^2 \ll T_{22}^2$ ($T_{12}^2$ is excessively smaller than $T_{22}^2$), the optical characteristic measuring section 26 determines that there is a deviation, and determines that there is no deviation otherwise. For example, there is set an upper threshold in advance, and the optical characteristic measuring section 26 determines that there is an excess if $T_{12}^2/T_{22}^2$ exceeds the upper threshold. Moreover, for example, a lower threshold is set in advance, and the optical characteristic measuring section 26 determines that there is an excess if $T_{12}^2/T_{22}^2$ is less than the lower threshold.

If there is a deviation between the powers $T_{12}^2$ and $T_{22}^2$ measured upon the S wave input ("YES" in S32), the optical characteristic measuring section 26 uses τsg to obtain $\tau_{22}$ or $\tau_{12}$ (S34).

On this occasion, there are following relationships among $T_{12}^2$, $T_{22}^2$, $\tau_{22}$, and $\tau_{12}$, which are the measured results by the first measuring section 24, and $Ts^2$ and τsg, which are the measured results by the second measuring section 25. It should be noted that a proof thereof will be provided later. In addition, $\theta'=\tau$.

[EQU. 12]

$$T_s^2 = T_{12}^2 + T_{22}^2 \quad (16)$$

$$\tau_{sg} = \frac{T_{12}^2 \theta'_{12} + T_{22}^2 \theta'_{22}}{T_{21}^2 + T_{22}^2} \quad (17)$$

If $T_{12}^2 \gg T_{22}^2$, the S/N ratio of $\tau_{22}$ is low, which is the measured result of the first measuring section 24. Thus, $\tau_{22}$ is calculated from $T_{12}^2$, $T_{22}^2$, $\tau_{12}$, and τsg according to the equation (17). If $T_{12}^2 \gg T_{22}^2$, the S/N ratios of $\tau_{12}$, which is the measured result of the first measuring section 24, and τsg, which is the measured result of the second measuring section 25, are high. As a result, if the $\tau_{22}$ is calculated according to the equation (17), the S/N ratio of $\tau_{22}$ becomes high.

If $T_{12}{}^2 \ll T_{22}{}^2$, the S/N ratio of $\tau_{12}$ is low, which is the measured result of the first measuring section 24. Thus, $\tau_{12}$ is calculated from $T_{12}{}^2$, $T_{22}{}^2$, $\tau_{22}$, and $\tau_{sg}$ according to the equation (17). If $T_{12}{}^2 \ll T_{22}{}^2$, the S/N ratios of $\tau_{22}$, which is the measured result of the first measuring section 24, and $\tau_{sg}$, which is the measured result of the second measuring section 25, are high. As a result, if the $\tau_{12}$ is calculated according to the equation (17), the S/N ratio of $\tau_{12}$ becomes high.

After the calculation of $\tau_{22}$ or $\tau_{12}$ using $\tau_{sg}$ (S34), or there is no deviation between the powers $T_{12}{}^2$ and $T_{22}{}^2$ measured upon the S wave input ("NO" in S32), the optical characteristic measuring section 26 proceeds to the measurement of the group delay time $\tau g$ (S42).

Namely, the group delay time measuring section 28 measures the group delay time $\tau g$ of the optical fiber 18 based upon $\tau pg$ and $\tau sg$, which are measured results of the second measuring section 25 (S42). The group delay time $\tau g$ of the optical fiber 18 is represented as $(\tau pg + \tau sg)/2$.

According to the embodiment of the present invention, the second measuring section 25 measures the phase shift equivalent values (group delay times $\tau pg$ and $\tau sg$) of the incident light based upon the light emitted from the optical fiber 18. If there is observed a deviation for the p-polarization axis or the s-polarization axis between the amplitude equivalent values (powers) ($T_{11}{}^2$ is excessively smaller (larger) than $T_{21}{}^2$ or $T_{12}{}^2$ is excessively smaller (larger) than $T_{22}{}^2$), which are measured results by the first measuring section 24, the optical characteristic measuring section 26 measures the optical characteristics of the device under test (group delay times $\tau_{11}$, $\tau_{21}$, $\tau_{12}$, and $\tau_{22}$) based upon the measured results (group delay times $\tau pg$ and $\tau sg$) by the second measuring section 25.

Consequently, even if there is observed a deviation between the amplitude equivalent values (powers) by the first measuring section 24 for the p-polarization axis or the s-polarization axis, since the optical characteristic of the optical fiber 18 is measured based upon the measured results (which are not influenced by the deviation between the powers for the p-polarization axis or the s-polarization axis) by the second measuring section 25, it is possible to prevent an adverse effect upon the measurement of the optical characteristic due to an deviation between the polarization components.

Although the group delay times $\tau_{11}$, $\tau_{21}$, $\tau_{12}$, and $\tau_{22}$ are selected as an example of the optical characteristic, further examples of the optical characteristic such as the wavelength dispersion, the wavelength dispersion slope, and the polarization mode dispersion may be obtained accurately by measuring the group delay times accurately. This is because they can be obtained based upon the group delay times $\tau_{11}$, $\tau_{21}$, $\tau_{12}$, and $\tau_{22}$.

Moreover, the group delay time measuring section 28 can improve the S/N ratios of the measured values of the group delay times of the optical fiber 18.

In addition, the above-described embodiment can be realized in the following manner. A computer is provided with a CPU, a hard disk, and a media (such as a floppy disk and a CD-ROM) reader, and the media reader is caused to read a medium which is recording a program realizing the above-described respective sections such as the first measuring section 24, the second measuring section 25, the optical characteristic measuring section 26, and the group delay time measuring section 28, for example, thereby installing the program on the hard disk. This method may realize the above-described functions.

[Proof of the relationships (equations 14 to 17) among the measured results $T_{12}{}^2$, $T_{22}{}^2$, $\tau_{22}$ and $\tau_{12}$ by the first measuring section 24 and the measured results $T_s{}^2$ and $\tau_{sg}$ by the second measuring section 25]

It is assumed that the incident light is in an arbitrarily polarized state. On this occasion, it is assumed that an x axis and a y axis denote two axes perpendicular to the incident surface of a DUT, and Ep denotes an amplitude of an x-axis component of the incident light, and $Ese^{j\theta k}$ denotes an amplitude of a y-axis component thereof. An x-axis component and a y-axis component (respectively denoted as Epout and Esout) of light emitted from the DUT are represented by the following equation by means of a transmission function matrix.

[EQU. 13]

$$\begin{bmatrix} E_{pout} \\ E_{sout} \end{bmatrix} = \begin{bmatrix} T_{11}e^{j\theta_{11}} & T_{12}e^{j\theta_{12}} \\ T_{21}e^{j\theta_{21}} & T_{22}e^{j\theta_{22}} \end{bmatrix} \begin{bmatrix} E_p \\ E_s e^{j\theta_\Delta} \end{bmatrix} \quad (31)$$

A complex amplitude Eout of the emitted light is represented by the following equation by means of a transmission function matrix.

[EQU. 14]

$$E_{out} = Te^{j\theta} \quad (32)$$

$$= E_{pout} i_x + E_{sout} i_y$$

$$= \{T_{11}e^{j\theta_{11}} E_p + T_{12}e^{j(\theta_{12}+\theta_\Delta)} E_s\} i_x +$$

$$(T_{21}e^{j\theta_{21}} E_p + T_{22}e^{j(\theta_{22}+\theta_\Delta)} E_s) i_y$$

ix and iy respectively denote unit vectors in the x-axis and y-axis directions.

On this occasion, a power and a group delay time are measured by causing a network analyzer to measure an electrical signal resulting from reception of Eout. The group delay time is obtained by differentiating the phase represented by the following equation by an angular frequency, and the power $T^2$ and the group delay time $\tau$ are represented by the following equations.

Since $i_x \cdot i_x = i_y \cdot i_y = 1, i_x \cdot i_y = 0$,

[EQU. 15]

$$T^2 = T_{11}{}^2 E_p{}^2 + T_{12}{}^2 E_s{}^2 + T_{21}{}^2 E_p{}^2 + T_{22}{}^2 E_s{}^2 + 2T_{11}T_{12}E_pE_s \cos(\theta_{11}-\theta_{12}-\theta_\Delta) + 2T_{21}T_{22}E_pE_s \cos(\theta_{21}-\theta_{22}\theta_\Delta) \quad (33)$$

$$\theta = \tan^{-1}\left\{\frac{\text{img}(Te^{j\theta})}{\text{real}(Te^{j\theta})}\right\} \quad (34)$$

$\text{real}(Te^{j\theta}) = \{T_{11}E_p \cos\theta_{11} + T_{12}E_s \cos(\theta_{12}+\theta_\Delta)\} i_p +$
$\{T_{21}E_p \cos\theta_{21} + T_{22}E_s \cos(\theta_{22}+\theta_\Delta)\} i_s, \text{img}(Te^{j\theta}) =$
$\{T_{11}E_p \sin\theta_{11} + T_{12}E_s \sin(\theta_{12}+\theta_\Delta)\} i_p + \{T_{21}E_p \sin\theta_{21} + T_{22}E_s \sin(\theta_{22}+\theta_\Delta)\} i_s \quad (35)$ $$\tau = \frac{d}{d\omega}\theta \quad (36)$$

$$= \frac{\left\{\frac{\text{img}(Te^{j\theta})}{\text{real}(Te^{j\theta})}\right\}'}{1+\left\{\frac{\text{img}(Te^{j\theta})}{\text{real}(Te^{j\theta})}\right\}^2}$$

$$= \frac{\text{img}'(Te^{j\theta})\cdot\text{real}(Te^{j\theta}) - \text{real}'(Te^{j\theta})\cdot\text{img}(Te^{j\theta})}{\text{real}^2(Te^{j\theta}) + \text{img}^2(Te^{j\theta})}$$

$$= \frac{\text{img}'(Te^{j\theta})\cdot\text{real}(Te^{j\theta}) - \text{real}'(Te^{j\theta})\cdot\text{img}(Te^{j\theta})}{T^2}$$

$$= \frac{\begin{bmatrix} T_{11}^2 E_p^2 \vartheta'_{11} + T_{12}^2 E_s^2 \vartheta'_{12} + T_{21}^2 E_p^2 \vartheta'_{21} + T_{22}^2 E_s^2 \vartheta'_{22} + \\ \left\{\begin{array}{l}(\theta'_{11}+\theta'_{12})T_{11}T_{12}\cos(\theta_{11}-\theta_{12}-\theta_\Delta)+ \\ (\theta'_{21}+\theta'_{22})T_{21}T_{22}\cos(\theta_{21}-\theta_{22}-\theta_\Delta)\end{array}\right\}E_p E_s + \\ \left\{\begin{array}{l}(T'_{11}T_{12}-T_{11}T'_{12})\sin(\theta_{11}-\theta_{12}-\theta_\Delta)+ \\ (T'_{21}T_{22}-T_{21}T'_{22})\sin(\theta_{21}-\theta_{22}-\theta_\Delta)\end{array}\right\}E_p E_s \end{bmatrix}}{T^2} \quad (37)$$

If it is assumed that the linearly polarized wave parallel to the x axis is a P wave, and the linearly polarized wave parallel to the y axis is an S wave, the powers and the group delay time characteristics upon the P wave and the S wave being respectively input are obtained as follows.

If the P wave is input, the equation (14) and the equation (15) are obtained by assigning Ep=1, Es=0, and $\theta_A$=0 to the equation (33) and the equation (37).

If the S wave is input, the equation (16) and the equation (17) are obtained by assigning Ep=0, Es=1, and $\theta_A$=0 to the equation (33) and the equation (37).

[End of Proof]

The invention claimed is:

1. An optical characteristic measuring instrument that measures an optical characteristic of a device under test, comprising:
a polarization separator that receives light emitted from the device under test, separates the received light into p-polarized light and s-polarized light, and outputs the p-polarized light and s-polarized light;
a light generator that generates incident light;
an optical modulator that applies intensity modulation to the incident light, and emits modulated light;
a light inputter that makes the incident light which has undergone the intensity modulation incident on the device under test, wherein the incident light is coincident with a p-polarization axis and an s-polarization axis of said polarization separator;
a first measurer that measures a phase shift equivalent value and an amplitude equivalent value of the incident light based upon the output from said polarization separator;
a second measurer that measures a phase shift equivalent value of the incident light based upon the light emitted from the device under test; and
an optical characteristic measurer that measures the optical characteristic of the device under test based upon the measured results by said first measurer and said second measurer,
wherein the optical characteristic measurer measures the optical characteristic of the device under test based upon the measured result by said second measurer, if there is a deviation between a p-polarization component of the amplitude equivalent value of the incident light and an s-polarization component of the amplitude equivalent value of the incident light, and
the measured result by said second measurer is not changed in accordance with the measured result by said first measurer.

2. The optical characteristic measuring instrument according to claim 1, wherein the phase shift equivalent value is obtained by differentiating a phase shift by an optical angular frequency.

3. The optical characteristic measuring instrument according to claim 2, wherein a group delay time measurer measures a group delay time of the device under test based upon the measured result by said second measurer.

4. The optical characteristic measuring instrument according to claim 1, wherein the amplitude equivalent value is the square of an amplitude.

5. An optical characteristic measuring method for measuring an optical characteristic of a device under test, comprising:
receiving light emitted from the device under test;
separating the received light into p-polarized light and s-polarized light;
outputting the p-polarized light and s-polarized light;
generating incident light;
applying intensity modulation to the incident light and emitting modulated light;
making the incident light which has undergone the intensity modulation incident on the device under test, wherein the incident light is coincident with a p-polarization axis and an s-polarization axis of said p-polarized light and s-polarized light;
measuring a phase shift equivalent value and an amplitude equivalent value of the incident light based upon the p-polarized light and s-polarized light;
measuring a phase shift equivalent value of the incident light based upon the light emitted from the device under test;
measuring the optical characteristic of the device under test based upon the measured phase shift equivalent value and amplitude equivalent value of the incident light based upon the p-polarized light and s-polarized light; and
measuring the optical characteristic of the device under test based upon the measured phase shift equivalent value of the incident light based upon the light emitted from the device under test, if there is a deviation between a p-polarization component of the amplitude equivalent value of the incident light and an s-polarization component of the amplitude equivalent value of the incident light,
wherein the result of measuring the phase shift equivalent value of the incident light based upon the light emitted from the device under test is not changed in accordance with the result of measuring the phase shift equivalent value and the amplitude equivalent value of the incident light based upon the p-polarized light and s-polarized light.

6. A computer-readable medium having a program of instructions for execution by a computer to perform an optical characteristic measuring process of an optical characteristic measuring instrument that measures an optical characteristic of a device under test, comprising: a polarization separator that receives light emitted from the device under test, separates the received light into p-polarized light and s-polarized light, and outputs the p-polarized light and s-polarized light; a light generator that generates incident light; an optical modulator that applies intensity modulation to the incident light, and emits modulated light; and a light inputter that makes the incident light which has undergone the intensity modulation incident on the device under test wherein the incident light is coincident with a p-polarization axis and an s-polarization axis of said polarization separator;

said optical characteristic measuring process comprising:

measuring a phase shift equivalent value and an amplitude equivalent value of the incident light based upon the output from said polarization separator;

measuring a phase shift equivalent value of the incident light based upon the light emitted from the device under test;

measuring the optical characteristic of the device under test based upon the measured phase shift equivalent value and amplitude equivalent value of the incident light based upon the p-polarized light and s-polarized light; and measuring the optical characteristic of the device under test based upon the measured phase shift equivalent value of the incident light based upon the light emitted from the device under test, if there is a deviation between a p-polarization component of the amplitude equivalent value of the incident light and an s-polarization component of the amplitude equivalent value of the incident light, wherein the result of measuring the phase shift equivalent value of the incident light based upon the light emitted from the device under test is not changed in accordance with the result of measuring the phase shift equivalent value and the amplitude equivalent value of the incident light based upon the p-polarized light and s-polarized light.

* * * * *